(12) United States Patent
Rivera

(10) Patent No.: US 9,689,483 B2
(45) Date of Patent: Jun. 27, 2017

(54) TORQUE CONVERTER COMPRISING AN EXTERNAL ONE WAY CLUTCH

(71) Applicant: Caterpillar Inc., Peoria, IL (US)

(72) Inventor: Edward De Jesus Rivera, Peoria, IL (US)

(73) Assignee: Caterpillar Inc., Peoai, IL (US)

( * ) Notice: Subject to any disclaimer, the term of this patent is extended or adjusted under 35 U.S.C. 154(b) by 8 days.

(21) Appl. No.: 14/515,749

(22) Filed: Oct. 16, 2014

(65) Prior Publication Data

US 2016/0109009 A1 Apr. 21, 2016

(51) Int. Cl.
 *F16H 41/24* (2006.01)

(52) U.S. Cl.
 CPC ....... *F16H 41/24* (2013.01); *F16H 2041/246* (2013.01)

(58) Field of Classification Search
 CPC ....... F16H 2041/246; F16H 2045/0205; F16H 2045/021
 See application file for complete search history.

(56) References Cited

U.S. PATENT DOCUMENTS

| | | | |
|---|---|---|---|
| 4,953,353 A * | 9/1990 | Lederman | F16H 41/24 188/82.84 |
| 5,586,434 A * | 12/1996 | Okubo | F16D 41/064 60/345 |
| 5,667,043 A | 9/1997 | Dehrmann et al. | |
| 5,992,589 A | 11/1999 | Fukushima | |
| 6,619,036 B2 | 9/2003 | Kawamoto et al. | |
| 7,975,819 B2 * | 7/2011 | Altmann | F16D 1/0852 192/107 T |
| 2001/0023802 A1 * | 9/2001 | Yoshimoto | F16H 41/28 192/3.21 |
| 2001/0032766 A1 * | 10/2001 | Yoshimoto | B62M 7/02 192/3.25 |
| 2014/0113767 A1 | 4/2014 | Jawalkar Nagaraj et al. | |

* cited by examiner

*Primary Examiner* — Richard Lorence
*Assistant Examiner* — Lillian Nguyen
(74) *Attorney, Agent, or Firm* — Edward Lin; Hibshman Claim Construction PLLC

(57) ABSTRACT

A torque converter including a stator, a one way clutch permitting rotation of the stator in a first direction and preventing rotation of the stator in a second opposite direction, and an adapter device including a first adapter portion connected to the stator and a second adapter portion connected to the one way clutch, so that the one way clutch is positioned offset and remote from the stator.

18 Claims, 4 Drawing Sheets

TORQUE CONVERTER COMPRISING AN EXTERNAL ONE WAY CLUTCH

TECHNICAL FIELD

The present disclosure relates generally to a torque converter, and more specifically to a torque converter comprising an external one way clutch.

BACKGROUND

Conventionally, a torque converter includes a stator with a one way clutch located within the stator. However, this limited the size of the one way clutch since its dimensions were constrained by the stator.

U.S. Pat. No. 5,992,589 to Fukushima ('589 Patent) discloses a torque converter having both a lock-up clutch and a disengaging clutch mechanism. In the '589 Patent, a torque converter is provided with both a lock-up clutch and a disengaging clutch for use with a manual transmission. When the disengaging clutch is engaged, torque is transmittable through a torque converter impeller and turbine fluid coupling. When the lock-up clutch is engaged, torque is mechanically transmitted through the lock-up clutch to a manual transmission input shaft.

A single control mechanism effects selective engagement and disengagement of both the lock-up clutch and the disengaging clutch. In an alternate embodiment of the present invention, a weight may be engaged and disengaged from various components within the torque converter to change the ratio of a moment of inertia of a power input mechanism and a power output mechanism defined by portions of the torque converter. A lock-up clutch in the alternate embodiment and the weight are also engaged and disengaged by a single control mechanism.

However, in the '589 Patent, the lock-up clutch may not be flexibly sized.

The system and method of the present disclosure solves one or more problems set forth above and/or other problems in the art.

SUMMARY

In one aspect, the present disclosure is directed to a torque converter including a stator, a one way clutch permitting rotation of the stator in a first direction and preventing rotation of the stator in a second opposite direction, and an adapter device including a first adapter portion connected to the stator and a second adapter portion connected to the one way clutch, so that the one way clutch is positioned offset and remote from the stator In another aspect, the present disclosure is directed to a method for operating a torque converter including permitting rotation of a stator in a first direction using a one way clutch offset from the stator, and an adapter device comprising a first adapter portion and a second adapter portion, wherein the first adapter portion is configured to be connected to the stator and the second adapter portion is configured to be connected to the one way clutch, and preventing rotation of the stator in a second direction opposite the first direction using the one way clutch and the adapter device.

In another aspect, the present disclosure is directed to a machine including a prime mover, and a torque converter. The torque converter can include a prime mover input configured to receive an input torque from the prime mover, an impeller configured to rotate in response to the prime mover input, a turbine configured to rotate in response to rotation of the impeller. The torque converter can also include a stator located between the impeller and the turbine, a one way clutch permitting rotation of the stator in a first direction and preventing rotation of the stator in a second opposite direction, and an adapter device including a first adapter portion connected to the stator and a second adapter portion connected to the one way clutch, so that the one way clutch is positioned offset and remote from the stator, and externally with respect to the impeller and the turbine.

DETAILED DESCRIPTION

Figure 1:
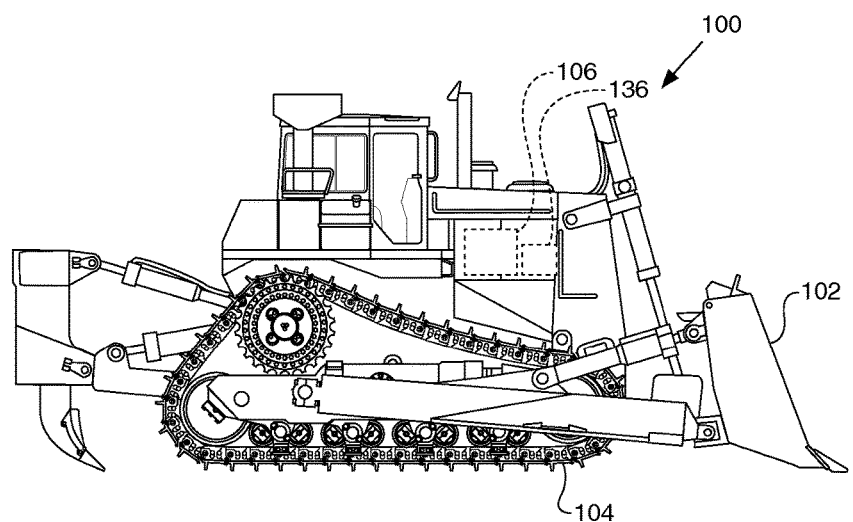
FIG. 1 depicts a machine according to an embodiment.

FIG. 1 depicts a machine 100 comprising an implement 102, a ground engaging device 104, a torque converter 106, and a prime mover 136. Although the machine 100 shown in FIG. 1 comprises a track type tractor, the machine 100 can comprise other devices which utilize the torque converter 106. For example, the machine 100 can comprise forestry machines, block handlers, wheel loaders, drag line devices, or on highway and off highway trucks.

The ground engaging device 104 can comprise, wheels, tracks, or other devices which can be utilized to move the machine 100. The implement 102 can be utilized to perform work for the machine 100. In an embodiment, the prime mover 136 is configured to be connected to the torque converter 106. The prime mover 136 can be configured to supply an input torque to the torque converter 106, which will be described in more detail later. In an embodiment, the prime mover 136 comprises an engine. The engine can be configured to utilize fuel with water, or fuel cells. Furthermore the engine can also be configured to utilize natural gas, or a combination of natural gas and liquid fuel.

Figure 2:
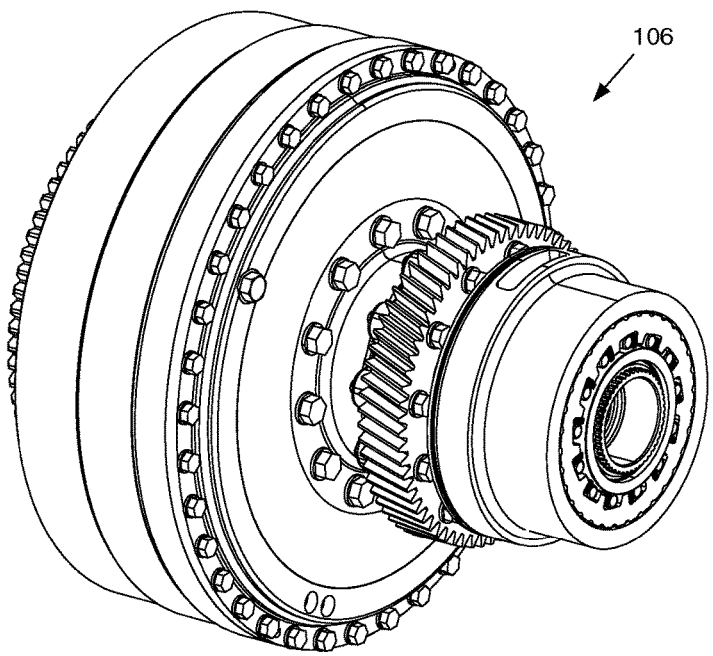
FIG. 2 depicts a torque converter according to an embodiment.
Figure 3:
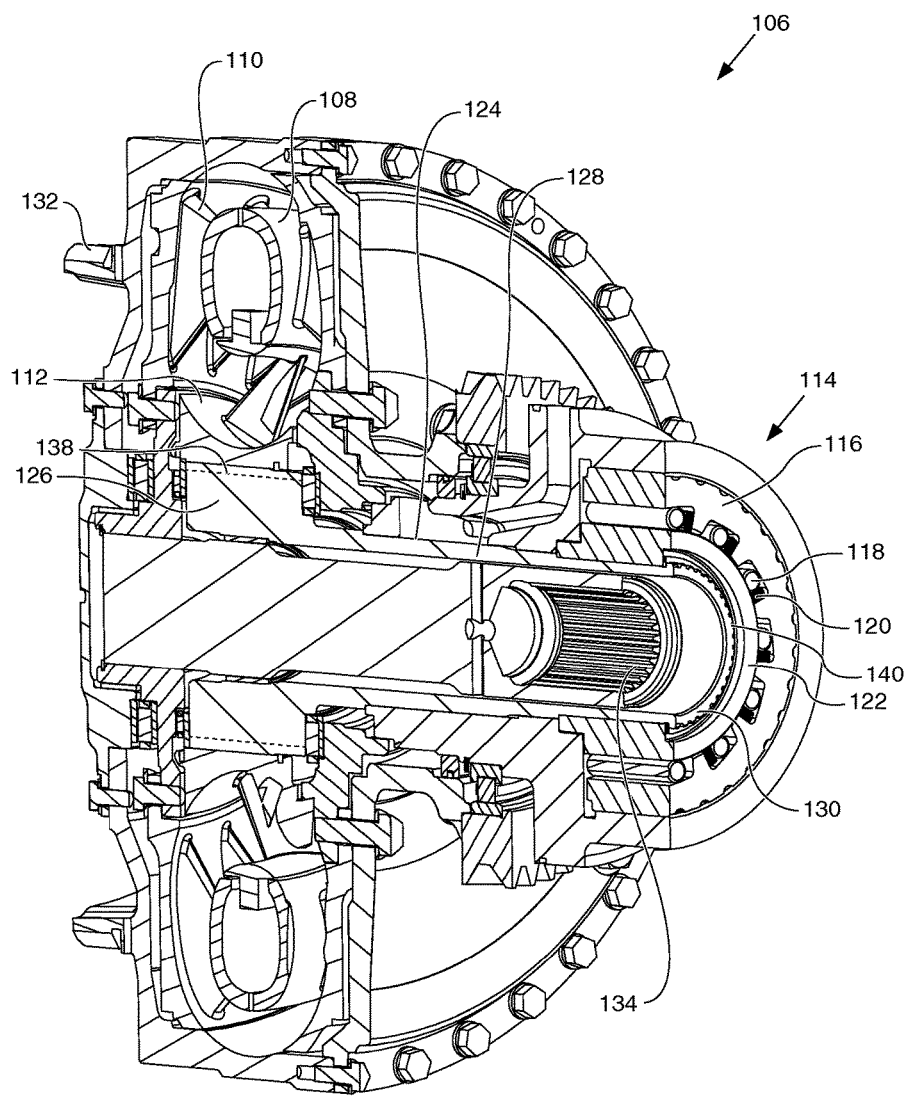
FIG. 3 is a partial perspective view of the torque converter according to an embodiment.
Figure 4:
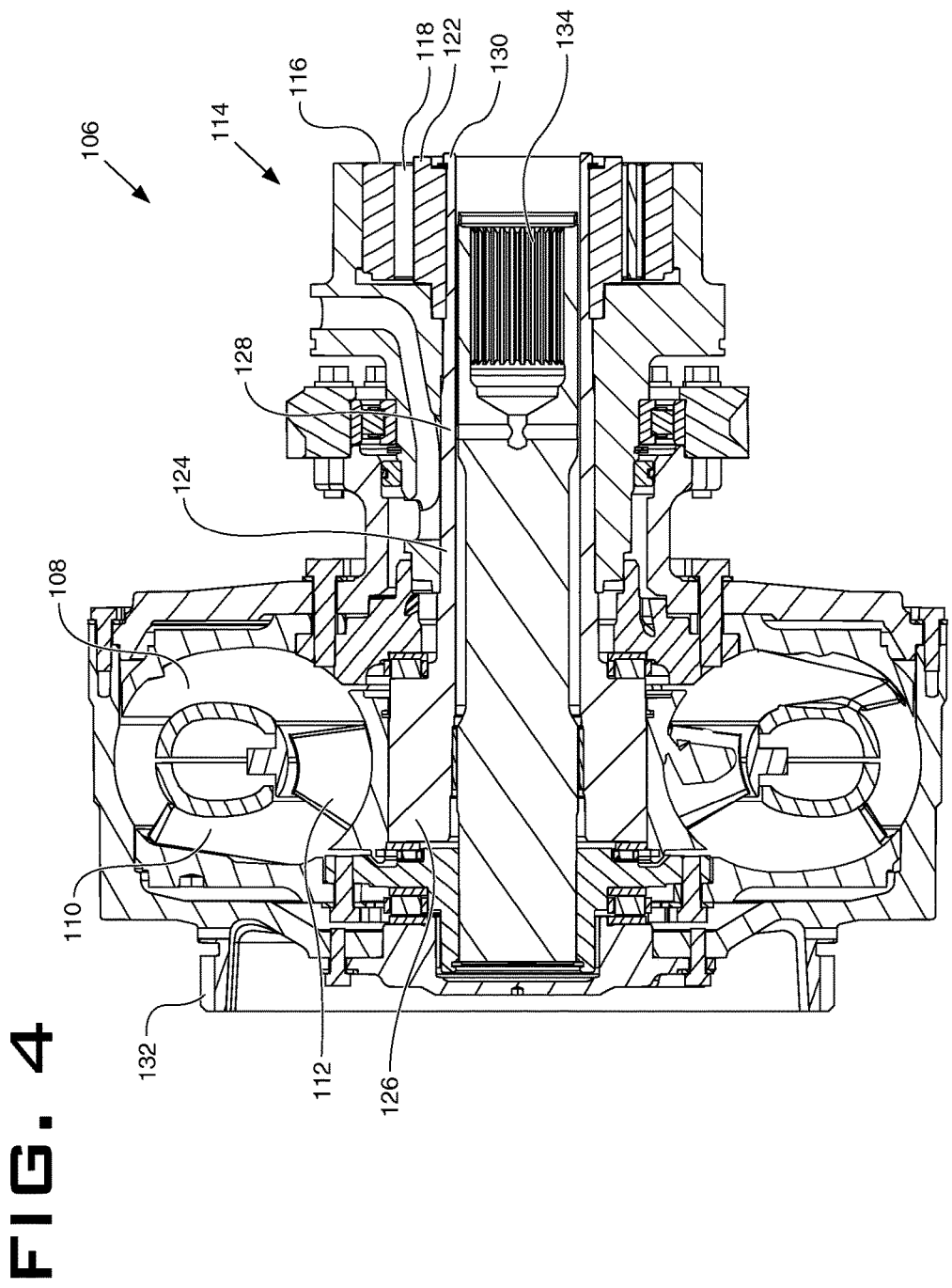
FIG. 4 is a partial side view of the torque converter according to an embodiment.

The torque converter 106 can be seen in FIGS. 2-4. The torque converter 106 can comprise a prime mover input 132 and torque converter output 134. The prime mover input 132 is configured to receive the input torque from the prime mover 136, while the torque converter output 134 is configured to output power from the torque converter 106. The power from the torque converter output 134 can be output to drive a load of a machine 100, or a transmission system of the machine 100.

The torque converter 106 also comprises an impeller 108, a turbine 110, a stator 112, a one way clutch 114, and an adapter device 124. The impeller 108 can be connected to the prime mover input 132 and be rotated in response to the input torque from the prime mover 136.

The stator 112 is configured to be located between the impeller 108 and the turbine 110. The stator 112 is configured to be connected to the one way clutch 114 by the adapter device 124. In an embodiment, the connection between the stator 112 and the one way clutch 114 comprises a mechanical connection.

The adapter device 124 can comprise a first adapter portion 126, a body 128, and a second adapter portion 130. The body 128 is configured to join the first adapter portion 126 and the second adapter portion 130. The first adapter portion 126 can be configured to be connected to the stator 112, while the second adapter portion 130 can be configured to be connected to the one way clutch 114.

In an embodiment, the first adapter portion 126 and the second adapter portion 130 are configured to have splines 138 and 140, respectively. The stator 112 and the one way clutch 114 can also comprise splines which are configured to cooperate with the splines 138 of the first adapter portion 126 and the splines 140 second adapter portion 130, respectively.

Thus, the cooperation of the splines of the stator 112 and the first adapter portion 126 allows for rotational motion of the stator 112 to be translated to the adapter device 124. Similarly, the cooperation of the splines of the stator 112 and the splines 138 of the first adapter portion 126 can prevent the stator 112 from rotating when the adapter device 124 is prevented from rotating.

The cooperation of the splines of the one way clutch 114 and the splines 140 of the second adapter portion 130 can allow for rotational motion of the adapter device 124 to be translated to the one way clutch 114. Similarly, the cooperation of the splines of the race 122 and the splines 140 of the second adapter portion 130 can prevent the adapter device 124 from rotating when the one way clutch 114 is prevented from rotating.

The one way clutch 114 is positioned such that it is offset and remote from the stator 112. For example, as can be seen in FIG. 4, the one way clutch 114 is not located directly below or within the stator 112. Instead, the one way clutch 114 is positioned away from the stator 112. The desired distance between the one way clutch 114 and the stator 112 can correlate to a length of the adapter device 124. More specifically, a length of the body 128 of the adapter device 124 can be varied depending on a desired distance between the one way clutch 114 and the stator 112.

As shown in FIG. 3, the one way clutch 114 can comprise a cam 116, a race 122, rollers 118, and springs 120. The cam 116 is configured to remain stationary, while the race 122 is configured to rotate, and to be connected to the second adapter portion 130. More specifically, the race 122 is configured to rotate in one direction only.

For example, the race 122 is configured to rotate in a first direction, and is prevented from rotating in a second direction. Thus, if the first direction was a clockwise direction, and the second direction was a counter-clockwise direction, the race 122 would be configured to rotate in the clockwise direction and be prevented from rotating in the counter-clockwise direction. In an embodiment, the rollers 118 and the springs 120 can cooperate with each other to permit the race 122 to rotate in one direction only. Although FIGS. 3 and 4 depicts the use of the rollers 118 and the springs 120, other directionally limiting devices may also be used to ensure that the one way clutch rotates in a single direction. Furthermore, the first direction and the second direction may also be reversed.

Furthermore, the race 122 can comprise splines to cooperate with the splines 140 of the second adapter portion 130.

INDUSTRIAL APPLICABILITY

In operation, the prime mover input 132 can receive the input torque from the prime mover 136. The impeller 108 can be configured to rotate in response to the prime mover input 132. The rotation of the impeller 108 may generate a hydrodynamic fluid coupling within the torque converter 106, which rotates the turbine 110. The stator 112 may be interposed between the impeller 108 and the turbine 110, and can positivity and efficiently alter the fluid flow between the turbine 110 and the impeller 108.

The stator 112 may freely rotate with the torque converter 106. However, the stator 112 is configured to rotate in the first direction, and is prevented from rotating in the second direction by the one way clutch 114.

When the stator 112 rotates, the adapter device 124 also rotates. Similarly, when the adapter device 24 rotates, the race 122 also rotates. However, as previously noted, the race 122 is permitted to rotate in a single direction by the rollers 118 and the springs 120. Since the race 122 is permitted to rotate in only a single direction, the adapter device 124 is also only permitted to rotate in a single direction. Therefore, the stator 112 is also only permitted to rotate in a single direction. That is, the stator 112 is permitted to rotate in the first direction, but not the second direction.

The rotational restriction of the stator 112 by the one way clutch 114 can provide efficiency gains and increase an amount of power supplied in the torque converter output 134.

Furthermore, since the one way clutch 114 is offset from the stator 112, the one way clutch 114 is not limited in size by the size of the stator 112. That is, the one way clutch 114 need not be sized to fit within the stator 112. For example, the size of the stator 112 does not need to be increased in order to increase the size of the one way clutch 114. Instead, an outer diameter of the one way clutch 114 can be larger than an inner diameter of the stator 112.

A larger one way clutch 114 can provide increased performance. For example, a larger one way clutch 114 can withstand larger amounts of torque. In an embodiment, the increase in diameter of the one way clutch 114 need not correspond on a one to one basis with an increase in the amount of torque that the one way clutch 114 can withstand. That is, a 20% increase in diameter of the one way clutch 114 can correspond to a greater than 20% ability to withstand torque.

Furthermore, the larger one way clutch 114 can be more durable and less prone to wear and tear. This can reduce the frequency with which the one way clutch 114 has to be replaced. In an embodiment increasing a size of the one way clutch 114 may be more efficient than increasing a strength of the material used to build the one way clutch 114.

Figure 5:
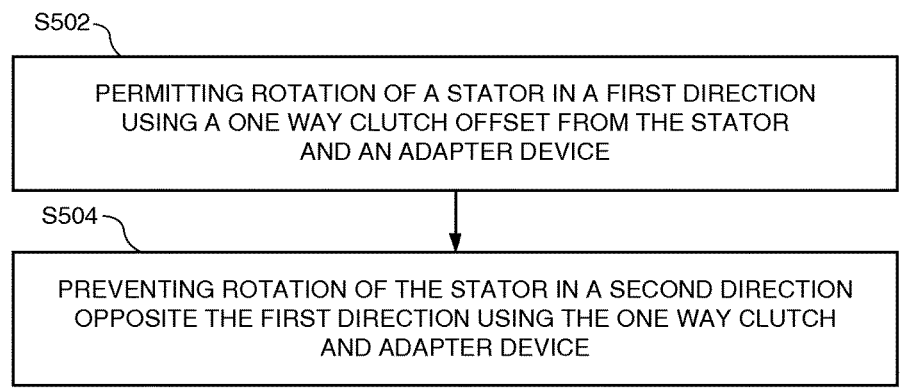
FIG. 5 depicts a process for operating a torque converter.

In an embodiment, a process for operating the torque converter 106 is shown in FIG. 5. In block S502, the stator 112 is permitted to rotate in a first direction using the one way clutch 114 offset from the stator 112 and the adapter device 124. In block S504, the stator is prevented from rotating in the second direction opposite the first direction using the one way clutch 114 and the adapter device 124.

Figure 6:
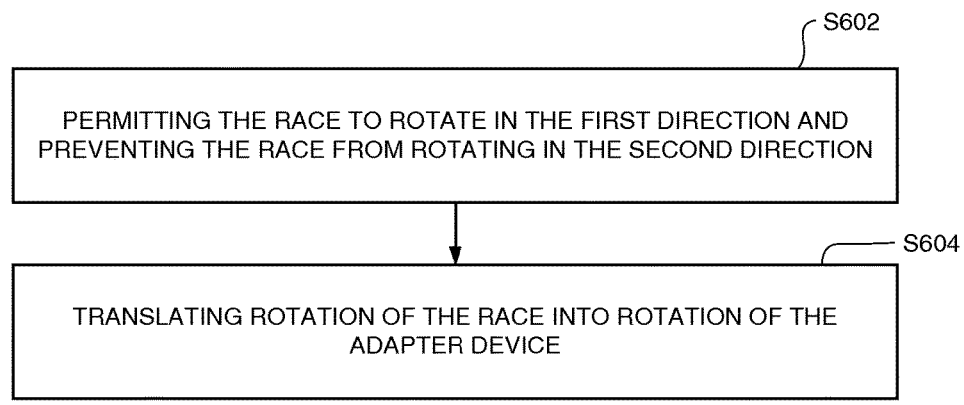
FIG. 6 depicts additional or optional steps for operating a torque converter.

In an embodiment, additional or optional steps for operating the torque converter 106 is shown in FIG. 6. In block S602, the race 122 of the one way clutch 114 is permitted to rotate in the first direction and prevented from rotating in the second direction. For example, the rollers 118 and the springs 120 can be utilized to permit and prevent rotation of the race 122. In block S604, rotating of the race is translated into rotation of the adapter device 124.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims.

What is claimed is:

1. A torque converter comprising:
   an impeller;
   a turbine;
   a stator disposed between the impeller and the turbine;
   a one way clutch permitting rotation of the stator in a first direction and preventing rotation of the stator in a second direction, the second direction being opposite the first direction; and
   an adapter device including a first adapter portion connected to the stator and a second adapter portion connected to the one way clutch, so that the one way clutch is positioned offset and remote from the stator,
   wherein an outer diameter of the one way clutch is larger than an inner diameter of the stator, and
   wherein the impeller is disposed between the one way clutch and the turbine along a rotational axis of the adapter device.

2. The torque converter of claim 1 wherein the first adapter portion and the second adapter portion each comprises splines.

3. The torque converter of claim 1 wherein the first adapter portion comprises a first adapter portion diameter, the second adapter portion comprises a second adapter portion diameter, and the first adapter portion diameter is larger than the second adapter portion diameter.

4. The torque converter of claim 1 wherein the one way clutch comprises a race configured to be connected to the second adapter portion.

5. The torque converter of claim 4 wherein the race is configured to rotate in the first direction and is prevented from rotating in the second direction.

6. The torque converter of claim 5 wherein rotation of the race translates into rotation of the adapter device.

7. The torque converter of claim 5 wherein the one way clutch comprises rollers and springs, and the rollers and springs permit the race to rotate in the first direction, and prevent the race from rotating in the second direction.

8. The torque converter of claim 1 wherein the first adapter portion is configured to be connected to an inside portion of the stator and the second adapter portion is configured to be connected to an inside portion of the one way clutch.

9. The torque converter of claim 1 further comprising:
   a prime mover input configured to receive an input torque from a prime mover;
   an impeller configured to rotate in response to the prime mover input; and
   a turbine configured to rotate in response to rotation of the impeller, wherein the stator is located between the impeller and the turbine, and the adapter device is located external to the impeller and the turbine.

10. A method for operating a torque converter, the torque converter including an impeller, a turbine, and a stator disposed between the impeller and the turbine, the method comprising:
    coupling a one way clutch to the stator via an adapter device, the impeller being disposed between the one way clutch and the turbine along a rotational axis of the adapter device, an outer diameter of the one way clutch being larger than an inner diameter of the stator, the one way clutch being located offset and remote from the stator;
    permitting rotation of the stator in a first direction using the one way clutch and an adapter device comprising a first adapter portion and a second adapter portion; and
    preventing rotation of the stator in a second direction that is opposite the first direction using the one way clutch and the adapter device.

11. The method of claim 10 wherein the one way clutch comprises a race configured to be connected to the adapter device.

12. The method of claim 11 further comprising permitting the race to rotate in the first direction and preventing the race from rotating in the second direction.

13. The method of claim 12 further comprising translating rotation of the race into rotation of the adapter device.

14. The method of claim 12 further comprising permitting the race to rotate in the first direction using rollers and springs in the one way clutch, and preventing the race from rotating in the second direction using the rollers and springs.

15. The method of claim 10 wherein the adapter device includes a first adapter portion and a second adapter portion, the method further comprising connecting the first adapter portion to an inside portion of the stator, and connecting the second adapter portion to an inside portion of the one way clutch.

16. A machine comprising:
    a prime mover; and
    a torque converter, the torque converter comprising:
      a prime mover input configured to receive an input torque from the prime mover;
      an impeller configured to rotate in response to the prime mover input;
      a turbine configured to rotate in response to rotation of the impeller;
      a stator located between the impeller and the turbine;
      a one way clutch permitting rotation of the stator in a first direction and preventing rotation of the stator in a second direction, the second direction being opposite the first direction; and
      an adapter device including a first adapter portion connected to the stator and a second adapter portion connected to the one way clutch, so that the one way clutch is positioned offset and remote from the stator, and external to the impeller and the turbine,
    wherein an outer diameter of the one way clutch is larger than an inner diameter of the stator, and
    wherein the impeller is disposed between the one way clutch and the turbine along a rotational axis of the adapter device.

17. The machine of claim 16 wherein the first adapter portion and the second adapter portion each comprises splines.

18. The machine of claim 16 wherein the first adapter portion comprises a first adapter portion diameter and the second adapter portion comprises a second adapter portion diameter, wherein the first adapter portion diameter is larger than the second adapter portion diameter.

* * * * *